United States Patent
Bonadies et al.

(10) Patent No.: US 7,243,488 B2
(45) Date of Patent: Jul. 17, 2007

(54) METHOD AND APPARATUS FOR CONTROLLING REGENERATION TEMPERATURE IN A DIESEL PARTICULATE TRAP

(75) Inventors: Joseph V. Bonadies, Clarkston, MI (US); David A. Goulette, Marine City, MI (US); Mansour Masoudi, Clarkston, MI (US); Joachim Kupe, Davisburg, MI (US); Russell H. Bosch, Gaines, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/215,487

(22) Filed: Aug. 30, 2005

(65) Prior Publication Data

US 2007/0044454 A1  Mar. 1, 2007

(51) Int. Cl.
*F01N 3/00* (2006.01)

(52) U.S. Cl. ............. 60/295; 60/274; 60/286; 60/289; 60/297; 60/311

(58) Field of Classification Search ............ 60/274, 60/286, 289, 295, 297, 303, 311
See application file for complete search history.

(56) References Cited

U.S. PATENT DOCUMENTS

| | | | | |
|---|---|---|---|---|
| 5,974,791 A | * | 11/1999 | Hirota et al. | 60/276 |
| 6,832,473 B2 | * | 12/2004 | Kupe et al. | 60/286 |
| 6,915,629 B2 | * | 7/2005 | Szymkowicz | 60/289 |
| 6,969,413 B2 | * | 11/2005 | Yahata et al. | 55/282.3 |
| 7,000,382 B2 | * | 2/2006 | Lee et al. | 60/286 |

* cited by examiner

*Primary Examiner*—Thomas Denion
*Assistant Examiner*—Diem Tran
(74) *Attorney, Agent, or Firm*—Paul L. Marshall

(57) ABSTRACT

A diesel exhaust gas system includes a diesel particulate filter (DPF), a trap for nitrogen oxides (LNT), a hydrocarbon catalytic reformer for generating reformate, and an air supply. A method for controlling the rate of burn of soot in a DPF limits the oxygen percentage in the exhaust to about 6%. The LNT may be located ahead of the DPF in the exhaust line. Reformate is directed with exhaust through the LNT. The second flow of air cools the exhaust gas and thereby prevents overheating of the DPF substrate. The DPF also may be located ahead of the LNT. Reformate is controllably combusted by the second air flow in the DPF, reducing the oxygen percentage to about 6%, thus limiting the rate at which soot in the DPF can burn and thereby preventing overheating of the DPF substrate.

18 Claims, 3 Drawing Sheets

METHOD AND APPARATUS FOR CONTROLLING REGENERATION TEMPERATURE IN A DIESEL PARTICULATE TRAP

TECHNICAL FIELD

The present invention relates to exhaust emissions control systems for internal combustion engines; more particularly, to means for regenerating an exhaust gas particulates trap in a diesel engine exhaust system; and most particularly, to method and apparatus for controlling temperature in a diesel particulates trap during regeneration thereof.

BACKGROUND OF THE INVENTION

Internal combustion engine exhaust emissions, and especially diesel engine exhaust emissions, have recently come under scrutiny with the advent of stricter regulations, both in the U.S. and abroad. While diesel engines are known to be more economical to run than spark-ignited engines, diesel engines inherently suffer disadvantages in the area of emissions. For example, in a diesel engine, fuel is injected during the compression stroke, as opposed to during the intake stroke in a spark-ignited engine. As a result, a diesel engine has less time to thoroughly mix the air and fuel before ignition occurs. The consequence is that diesel engine exhaust contains incompletely burned fuel known as particulate matter.

It is known to use particulate traps which physically trap the particulates. Such traps are expected to be in widespread use on all diesel market segments beginning in 2007. However, diesel particulate traps (DPT), both catalyzed and non-catalyzed, tend to load up with accumulated soot and therefore must be repeatedly regenerated by catalytically oxidizing the trapped particulates.

Because a diesel engine runs relatively lean (approximately 60:1 air/fuel ratio at idle), nitrogen oxides (NOx) are readily developed in diesel exhaust. It is also known to use a catalytic trap (Lean NOx Trap, or LNT) to remove nitrogen oxides from a diesel exhaust stream. Typically, oxides of nitrogen are trapped by reaction with barium cation in an LNT. Because the capacity of such a trap is finite, an LNT also requires periodic regeneration.

A currently challenging durability issue in the DPT art is cracking or melting of a substrate due to large temperature excursions within the bed of the filter. These temperature excursions are caused by the exothermic reaction of carbon and oxygen when the soot loading exceeds a critical level (approximately 5 grams per liter of cordierite substrate, and approximately 10 grams per liter of silicon carbide substrate) and the flow rate of exhaust through the DPT is reduced by idle or low-load engine operating conditions. Under these conditions, the exhaust contains a high percentage of oxygen (18% or more), thus fueling a very rapid combustion of the soot, but at a low total flow rate, thus reducing convective cooling of the hot substrate. This combination of events (rapid combustion and low cooling) can result in excessive filter temperature and/or temperature gradients, resulting in substrate failure.

What is needed in the art is a means for regulating the temperature of combustion of soot in a DPT during regeneration thereof to prevent damage to the DPT substrate.

It is a principal object of the present invention to prevent damage to a DPT substrate by overheating during regeneration thereof.

SUMMARY OF THE INVENTION

Briefly described, a diesel exhaust gas system in accordance with the invention includes exhaust aftertreatment comprising a catalytic diesel particulate filter (CDPF) and optionally a lean NOx trap (LNT) for nitrogen oxides formed under fuel-lean engine operating conditions. The system includes a hydrocarbon catalytic reformer and an auxiliary air supply system for generating reformate containing $H_2$ and CO. A method in accordance with the invention for controlling the rate of burn of soot in a CDPF is directed to limiting the residual oxygen percentage in the exhaust passing into the CDPF to about 10% or less, and preferably less than 6%. Soot combustion is limited or non-existent under this oxygen content.

In a first method and apparatus in accordance with the invention, the LNT is located ahead of the CDPF in the exhaust line. The volume of air supplied can be optionally divided between a first reforming flow to the reformer and a second flow to the CDPF. A controlled flow of reformate is generated in the reformer and is directed with the engine exhaust through the LNT and is oxidized to water ($H_2O$) and carbon dioxide ($CO_2$) before passing through the CDPF thereby reducing the oxygen percentage in the overall exhaust stream preferably to approximately 6% or less, thus limiting the rate at which soot in the CDPF can burn and thereby preventing overheating of the CDPF substrate. Optionally, the second flow of air being sent to the CDPF cools the exhaust gas while the exhaust oxygen content is reduced to approximately 6% through the use of engine controls known to those skilled in the art, and thereby prevents overheating of the CDPF substrate.

In a second method and apparatus in accordance with the invention, the CDPF is located ahead of the LNT in the exhaust line. As in the previously discussed method and apparatus, the volume of air supplied is optionally divided between a first reforming flow to the reformer and a second flow to the CDPF. A controlled flow of reformate is generated in the reformer and is directed with the engine exhaust through the CDPF thereby reducing the oxygen percentage in the overall exhaust stream preferably to approximately 6% or less, thus limiting the rate at which soot in the CDPF can burn and thereby preventing overheating of the CDPF substrate.

In either embodiment, a further variant is to augment or supplant reformate by either in-cylinder or in-exhaust post-injection of fuel as an aftertreatment fuel source to scavenge oxygen in the exhaust, and to use the air pump from the reformer to increase the flow rate of air through the exhaust components.

BRIEF DESCRIPTION OF THE DRAWINGS

The present invention will now be described, by way of example, with reference to the accompanying drawing, in which.

DESCRIPTION OF THE PREFERRED EMBODIMENTS

Figure 1:
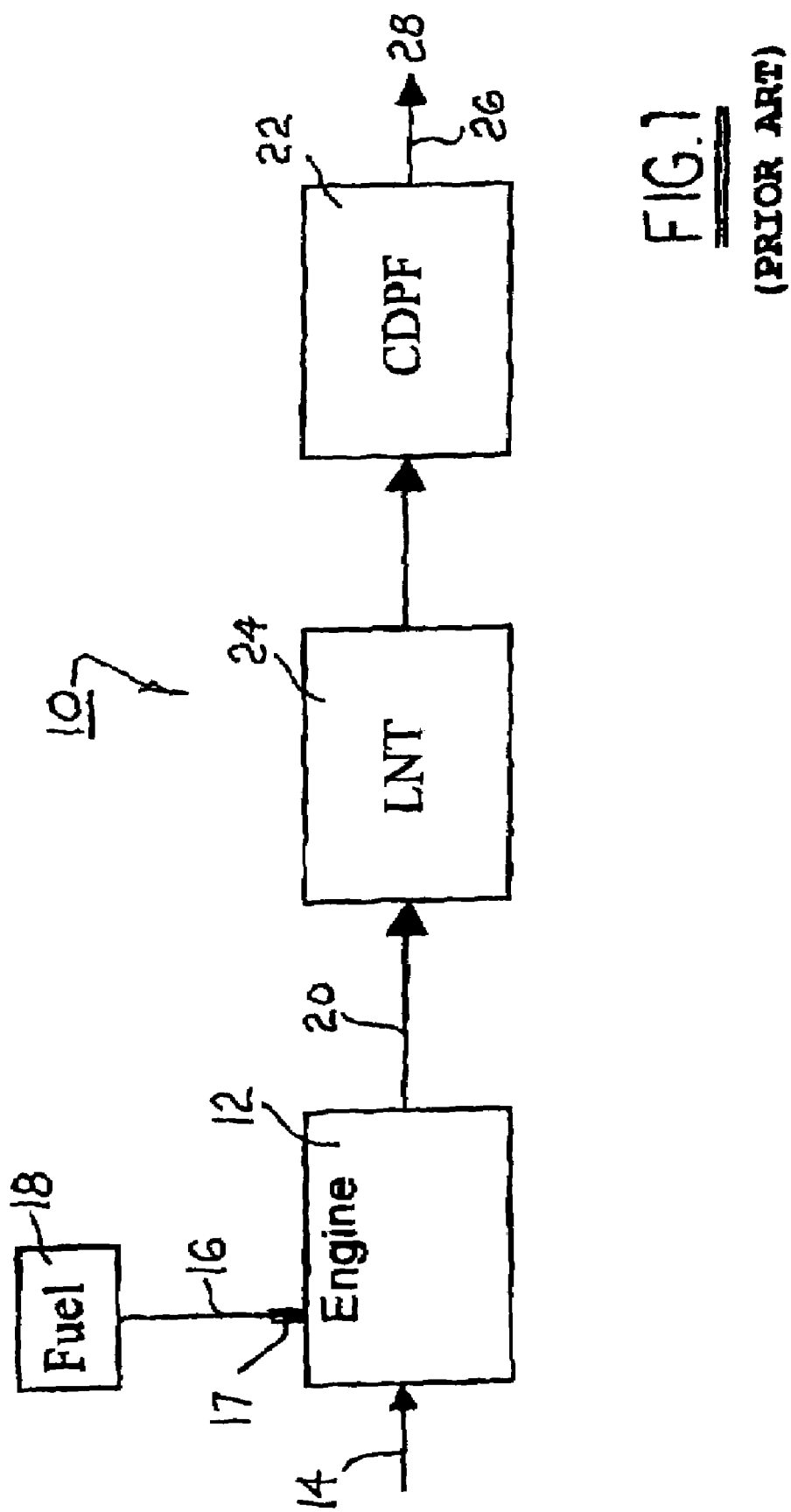
FIG. 1 is a schematic diagram of a prior art diesel exhaust system having a catalytic diesel particulate filter and a lean NOx trap.

Referring to FIG. 1, a prior art system 10 for managing diesel exhaust emissions comprises a diesel engine 12 supplied with intake air 14 and fuel 16 from a fuel source 18. Fuel 16 is injected into the combustion cylinders of engine 12 by injectors 17 near or at the start of the firing or power stroke in known fashion to generate engine torque and engine exhaust 20.

Engine exhaust 20 is passed through a Catalytic Diesel Particulate Filter (CDPF) 22 and optionally through a Lean NOx Trap (LNT) 24 that may be disposed ahead of or after CDPF 22. Treated exhaust 26 is passed to atmosphere 28.

Typically, an LNT is disposed ahead of a CDPF in light-duty diesel applications wherein trapping of nitrogen oxides formed during start-up conditions is important. Placing the LNT adjacent the engine allows for maximum rate of warming of the LNT after engine start. In heavy-duty diesel applications, dealing generally with higher loads and higher exhaust temperatures, the temperature window for an LNT may be exceeded if the LNT is placed adjacent the engine; therefore, the LNT typically is spaced from the engine by a CDPF (not as shown in FIG. 1), resulting in cooler conditions in the LNT.

In the prior art, regeneration of the CDPF occurs naturally during medium- to high-speed operation of the engine. Combustion of accumulated soot in the CDPF proceeds at a relatively low rate due to a high flow of exhaust, which prevents heat buildup from occurring during burning of soot, and a relatively low oxygen concentration in the exhaust. As noted above, a serious problem can arise under conditions of light load and/or low speed or idle wherein the flow of exhaust is relatively low and the oxygen concentration is relatively high.

It has been found that the spontaneous combustion of CDPF soot deposits occurs within acceptable temperature limits if the flow of exhaust gas through the CDPF is high, as at elevated engine speeds. Thus, under normal operating conditions, soot accumulated within the CDPF under conditions of low fuel efficiency will be burned off automatically when the engine returns to higher engine speeds and loads. However, if combustion in the CDPF is conducted under conditions of low exhaust flow and high oxygen content, combustion may be suppressed in accordance with the invention by also reducing the oxygen content of the exhaust gas stream entering the CDPF to about 6%. As the oxygen content of diesel exhaust can average about 18%, a method for controlling the oxygen content to about 6% or less requires means for scavenging oxygen in the exhaust stream. It is an important aspect of a method and apparatus in accordance with the invention to scavenge oxygen in the exhaust stream by controlled introduction of fuel and air into the exhaust stream, and subsequent combustion thereof along with some residual oxygen already present in the exhaust gas, ahead of the CDPF.

Figure 2:
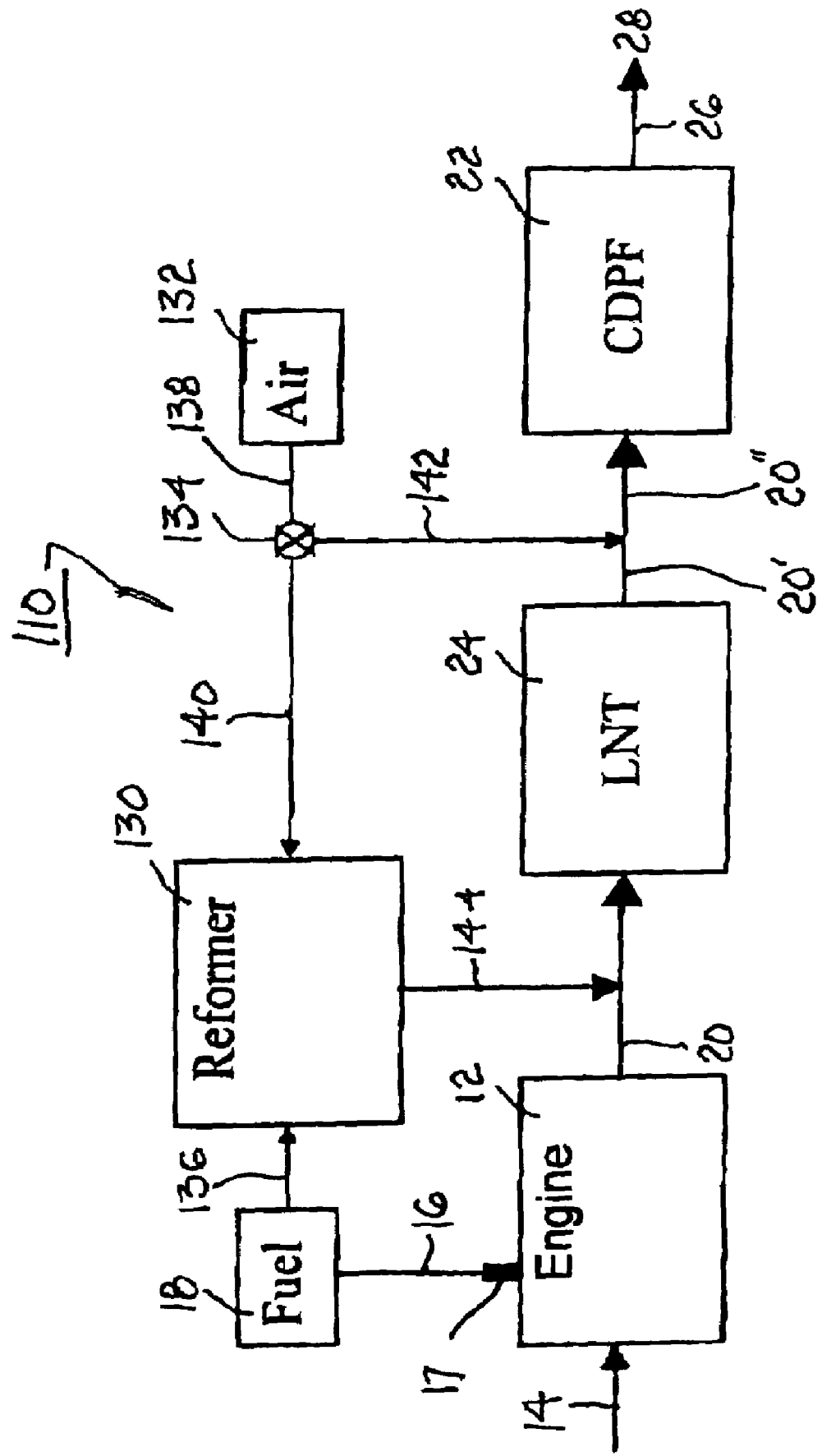
FIG. 2 is a schematic diagram in accordance with the invention of a first embodiment of a diesel exhaust system having capability for regeneration of a catalytic diesel particulate filter and a lean NOx trap.

Referring to FIG. 2, a first system 110 in accordance with the invention for controlling temperature within a CDPF includes elements 12–28 common to prior art system 10 for managing diesel exhaust emissions. System 110 is shown having LNT 24 ahead of CDPF 22, as in prior art system 10 shown in FIG. 1. In addition, system 110 comprises a catalytic hydrocarbon reformer 130, an auxiliary air supply 132, and a variable three-way valve 134.

In operation, reformer 130 draws hydrocarbon fuel 136 from a fuel supply (for convenience shown as being provided by engine fuel supply 18, although other hydrocarbon fuel supplies as are known for catalytic reforming are fully contemplated by the invention). Air supply 132 provides a stream of air 138 which may be selectively divided by valve 134 into a first portion 140 directed to reformer 130 for partially oxidizing hydrocarbon fuel 136 therein to produce reformate 144, and (as needed) a second portion 142 for mixing under certain conditions with exhaust stream 20 ahead of CDPF 22. Reformer 130 controllably generates a stream of hot reformate 144 that mixes with exhaust stream 20 ahead of LNT 24.

Air supply 132 may be a dedicated air pump or any other source of compressed air; for example, air from the compressor side of a turbocharger for the engine intake air 14 may be diverted to the CDPF in a control scheme based upon the CDPF temperature and the engine exhaust flow and temperature, as well as intake throttle position, exhaust gas recirculation, and post-combustion fuel injection.

Under lean air/fuel ratios wherein the temperature within the CDPF is too low for soot combustion to occur, the added hot reformate can increase the exhaust gas temperature to 450° C. or higher, at which temperature the soot within the CDPF can be oxidized. At low exhaust flow rates and low LNT oxidation bed temperatures, the reformate can be ignited ahead of the LNT in known fashion, for example by a sparking device or glow plug, to combust a portion of the hydrogen and carbon monoxide to achieve the desired exhaust temperature for soot oxidation in the CDPF while simultaneously reducing the residual oxygen content of the exhaust.

During engine operation, when the exhaust flow rate is suddenly reduced as by shifting to an idle or low-demand engine mode after the soot in CDPF 22 has been ignited, steps must be taken to avoid overheating and damage to the CDPF substrate. From LNT 24, hot exhaust gas 20' containing residual oxygen passes into CDPF 22. If the residual oxygen percentage is about 6% or less, in accordance with the invention, soot in CDPF 22 is barely oxidized to maintain an acceptable temperature and thereby regenerate the soot-trapping properties of CDPF 22 in a controlled fashion.

An alternate method of controlling the filter temperature is to activate valve 134 to provide a controlled flow of additional air 142 into exhaust stream 20' to form a cooled exhaust stream 20". The cooled exhaust stream 20" passing through CDPF 22 allows greater heat transfer to occur, thereby suppressing combustion of soot and protecting the filter substrate from damage. The flow of air 142 can be used in conjunction with engine controls such as intake throttle position, exhaust gas recirculation, and post-combustion injection to reduce the exhaust oxygen content below 6% to control the CDPF bed temperature.

Figure 3:
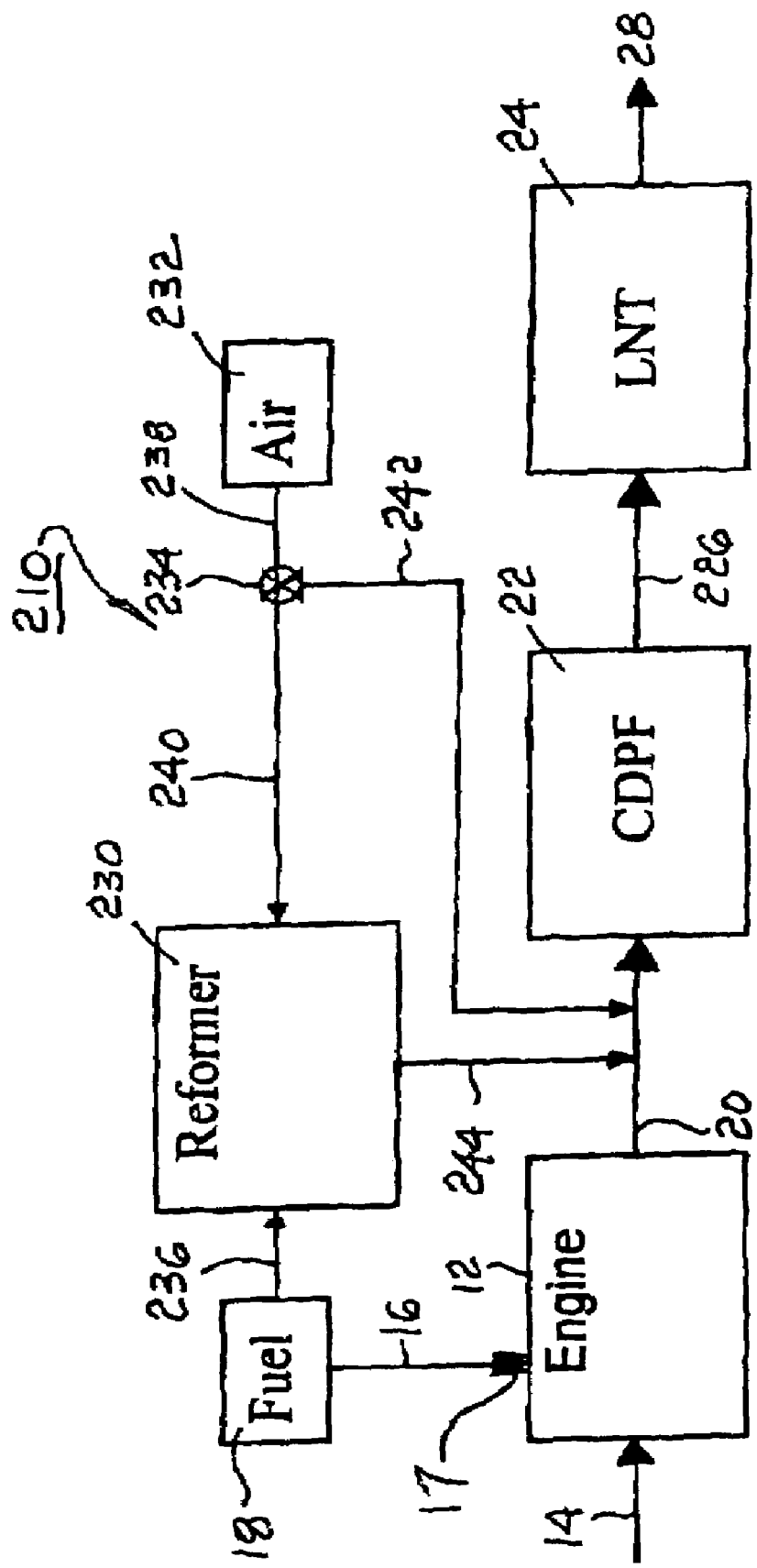
FIG. 3 is a schematic diagram of a second embodiment of such a system.

Referring to FIG. 3, in a second embodiment 210 in accordance with the invention, the components are as shown in FIG. 2 except that CDPF 22 is disposed in the exhaust stream ahead of LNT 24.

In operation, reformer 230 draws hydrocarbon fuel 236 from a fuel supply 18. Air supply 232 provides a stream of air 238 which may be selectively divided by valve 234 into a first portion 240 directed to reformer 230 for partially oxidizing hydrocarbons 236 therein, and (as needed) a second portion 242 for mixing under certain conditions with exhaust stream 20 ahead of CDPF 22. Reformer 230 controllably generates a stream of hot reformate 244 that also mixes with exhaust stream 20 ahead of CDPF 22.

The bed temperature of CDPF 22 can be reduced by combusting reformate 244 with air contained in exhaust stream 20 to reduce the exhaust oxygen content below the critical level for soot oxidation, thus preventing overheating of the CDPF bed by uncontrolled soot combustion. Alternatively, air 242 may be supplied to CDPF 22 as in embodiment 110 described above to improve the heat transfer through the CDPF, while methods of reducing exhaust oxygen content to about 6% or less are employed as previously mentioned.

In a variant of either system 110 or 210, a small amount of fuel from supply 18 may be controllably "post-injected" into the engine cylinders by the cylinder fuel injectors 17 at a point late in the power stroke such that unburned fuel is present in the exhaust stream entering the exhaust system. In this variant, the post-injected fuel may augment or supplant reformate 144,244 as a source of combustion fuel in either system. In some applications, it can be advantageous to operate the systems on post-injected fuel under some operating conditions and on reformate under other operating conditions, the control of such operating modes being administered by a programmable engine controller (not shown) operating in known fashion.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A system for controlling temperature in a diesel particulate filter in an exhaust gas stream of a diesel engine during regeneration thereof by combustion of soot collected therein, said engine exhaust stream including oxygen, the system comprising:
   a) a fuel source for providing fuel to said exhaust gas stream ahead of said diesel particulates filter; and
   b) an air source for providing air to said exhaust stream ahead of said diesel particulates filter,
   wherein said exhaust gas stream upon leaving said diesel engine has a residual oxygen content greater than about 6%,
   wherein said fuel and said oxygen in said exhaust stream are combusted to reduce said residual oxygen content in said exhaust gas passing through said diesel particulate filter; and
   wherein said air from said air source is selectively passed through said diesel particulates filter to cool the combustion of soot in said diesel particulates filter when the diesel engine is in an idle mode or a low-demand mode.

2. A system in accordance with claim 1 wherein said residual oxygen content is reduced to about 6%.

3. A system in accordance with claim 1 wherein said residual oxygen content is reduced to less than 6%.

4. A system in accordance with claim 1 wherein said fuel source is an engine cylinder fuel injector and said fuel is a hydrocarbon.

5. A system in accordance with claim 1 wherein said air source is selected from the group consisting of an auxiliary air pump and an engine turbocharger.

6. A system in accordance with claim 1 wherein said fuel source is a catalytic hydrocarbon reformer and said fuel is hydrocarbon reformate.

7. A system in accordance with claim 6 further comprising a nitrogen oxides trap disposed in said exhaust gas stream in line with said diesel particulate filter.

8. A method for controlling temperature in a diesel particulate filter in an exhaust gas stream of a diesel engine during regeneration thereof by combustion of soot collected therein, wherein said exhaust gas stream upon leaving said diesel engine has a residual oxygen content greater than about 6%, the method comprising the steps of:
   a) providing fuel to said exhaust gas stream ahead of said diesel particulates filter;
   b) combusting said fuel and said oxygen in said exhaust stream to reduce said residual oxygen content in exhaust gas passing through said diesel particulate filter; and
   c) selectively passing air through said diesel particulates filter to cool the combustion of soot in said diesel particulates filter when the diesel engine is in an idle mode or a low-demand mode.

9. A method in accordance with claim 8 wherein said combusting step is sufficient to reduce said residual oxygen content to about 6%.

10. A method in accordance with claim 8 wherein said combusting step is sufficient to reduce said residual oxygen content to less than 6%.

11. A method in accordance with claim 8 wherein said fuel is a hydrocarbon fuel injected into said exhaust gas within said engine.

12. A method in accordance with claim 8 comprising the further step of providing a catalytic hydrocarbon reformer, and wherein said fuel is hydrocarbon reformate from said reformer.

13. A diesel engine comprising a system for controlling temperature in a diesel particulates filter in an exhaust gas stream of said engine during regeneration thereof by combustion of soot collected therein, said engine exhaust stream including oxygen, said system including
   a fuel source for providing fuel to said exhaust gas stream ahead of said diesel particulates filter, and
   an air source for controllably providing air to said exhaust stream ahead of said diesel particulates filter,
   wherein said exhaust gas stream upon leaving said diesel engine has a residual oxygen content greater than about 6%,
   wherein said fuel and said oxygen in said exhaust stream are combusted to reduce said residual oxygen content in said exhaust gas passing through said diesel particulate filter; and
   wherein said air from said air source is selectively passed through said diesel particulates filter to cool the combustion of soot in said diesel particulates filter when the diesel engine is in an idle mode or a low-demand mode.

14. A system for controlling temperature in a diesel particulate filter in an exhaust gas stream of a diesel engine during regeneration thereof by combustion of soot collected therein, said engine exhaust stream including oxygen, the system comprising:
   a fuel source for providing fuel to said exhaust gas stream ahead of said diesel particulates filter;
   an air source for providing air to said fuel source to produce said fuel, said air source further providing air to said exhaust stream ahead of said diesel particulates filter;
   a valve for selectively controlling air provided by said air source to said fuel source and to said exhaust stream
   wherein said exhaust gas stream upon leaving said diesel engine has a residual oxygen content greater than about 6%,
   wherein said fuel and said oxygen in said exhaust stream are combusted to reduce said residual oxygen content in said exhaust gas passing through said diesel particulate filter; and wherein said air from said air source passes through said diesel particulates filter to cool the combustion of soot in said diesel particulates filter when the diesel engine is in an idle mode or a low-demand mode.

15. A system in accordance with claim 14 wherein said residual oxygen content is reduced to about 6%.

16. A system in accordance with claim 14 wherein said residual oxygen content is reduced to less than 6%.

17. A system in accordance with claim 14 wherein said fuel source is a catalytic hydrocarbon reformer and said fuel is hydrocarbon reformate.

18. A system in accordance with claim 17 further comprising a nitrogen oxides trap disposed in said exhaust gas stream in line with said diesel particulate filter.

* * * * *